F. H. DEWEY.
MOTOR VEHICLE HOIST DEVICE.
APPLICATION FILED APR. 15, 1918.
1,422,344.
Patented July 11, 1922.
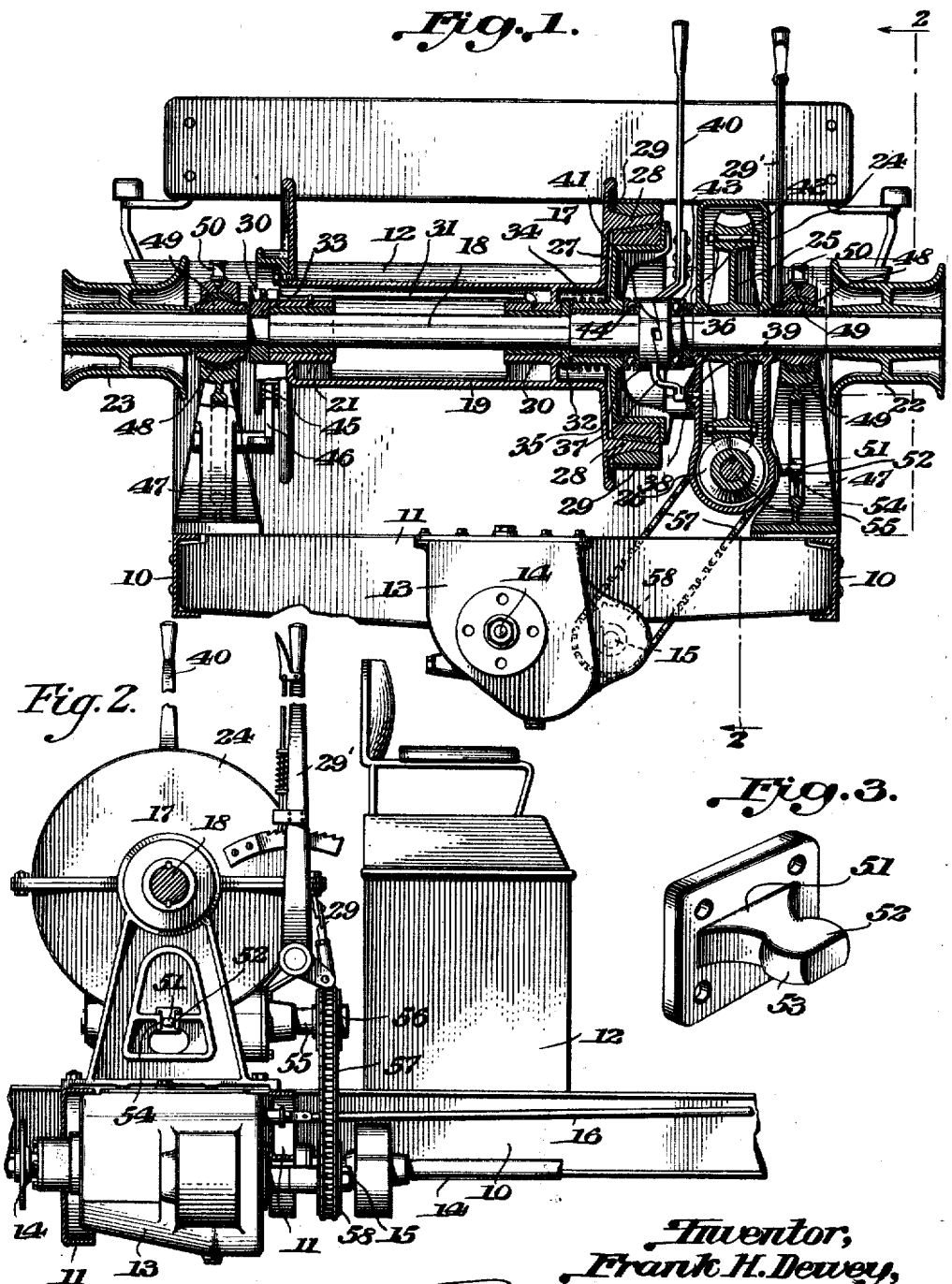
Inventor,
Frank H. Dewey,
By Milton Sibbitts, Atty

UNITED STATES PATENT OFFICE.

FRANK H. DEWEY, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE HOIST DEVICE.

1,422,344. Specification of Letters Patent. Patented July 11, 1922.

Application filed April 15, 1918. Serial No. 228,641.

*To all whom it may concern:*

Be it known that I, FRANK H. DEWEY, a citizen of the United States, and resident of Detroit, Wayne County, State of Michigan, have invented certain new and useful Improvements in Motor-Vehicle Hoist Devices, of which the following is a specification.

This invention relates to motor vehicles and particularly to the construction and mounting of a hoisting device thereon.

Where a hoisting device has its two separated bearings supported on a rigid base no difficulty is encountered in maintaining those bearings in alinement. When, however, such a device is mounted upon a vehicle frame comprising side members and cross members, said bearings are likely to be thrown out of alinement by any distortion of said frame and in the use of such vehicles with hoisting devices it is frequently desirable to operate the hoisting devices when the vehicle is on uneven ground and therefore with the frame somewhat distorted or warped out of its true normal position.

One of the objects of the present invention is to provide a motor vehicle with a hoisting device that is so mounted on the vehicle that distortion of the frame will not affect the alinement of the operating parts of the device and will not seriously affect the driving connection between the device and the vehicle driving shaft.

Another object of the invention is to provide a hoisting device in which the main shaft thereof is supported by spherical bearings which will permit a relative weaving movement of the supports for those bearings without throwing the various parts of the hoisting device out of line.

Other objects and features of novelty will appear from the following description taken in connection with the drawings which form a part of this specification, and in which:

Fig. 1 is a transverse vertical section through a motor vehicle and hoisting device embodying this invention;

Fig. 2 is a side elevation of the device shown in Fig. 1, the main shaft of the hoisting device being shown in section and the view being substantially on the line 2—2 of Fig. 1; and Fig. 3 is a detail view.

Referring to the drawings, 10 represents the two side members of the frame of a motor vehicle and 11 indicates cross members. Upon this frame is mounted a driver's seat 12, and beneath and at the rear of said seat is a gear box 13 into which the main driving shaft 14 extends. This main driving shaft is adapted to be driven by the vehicle motor, not shown, and a countershaft 15 is driven through suitable reduction gearing in the gear box 13 from said main shaft 14. Said counter-shaft 15 forms a driving shaft for the hoisting device hereinafter described.

The gears in the gear box 13 may be shifted for different speeds by any suitable devices and operated as by a gear shifter rod 16, Fig. 2.

A hoisting device is indicated generally by the numeral 17 and it comprises as its principal parts a main shaft 18, a main hoisting drum 19 rotatably mounted on the shaft 18 as by the bearings 20 and 21, side drums 22 and 23 which are keyed to the ends of the shaft 18, a casing 24 supported adjacent one end of the shaft and made in two parts as shown in Fig. 2 so that it may be readily mounted, a worm gear 25 mounted in the casing 24 and keyed to the shaft 18, a worm 26 supported by the casing 24 and in mesh with the gear 25, a cone clutch piece 27 also keyed to the shaft 18 and co-operating with the inner conical surface of a flange 28 on the main drum 19, and a brake 29 adapted to operate on the outer surface of said flange 28, said brake being of the contracting band form and manually controlled by a lever 29', as shown in both Figs. 1 and 2.

The bearings 20 and 21 are lubricated by a grease cup 30 and pipe 31, and thrust collars 32 and 33, the latter being a two part collar, hold the drum 19 against longitudinal movement on the shaft 18. The clutch piece 27 is held yieldingly in inoperative position by a spring 34 and it is manually moved into engagement with the flange 28 by means of co-operating collars 35 and 36 surrounding the shaft 18. The collar 35 has an arm 37 extending radially from it and provided with a pin 38 operating in an opening 39 in the casing 24, so that the collar 35 may move longitudinally of the shaft 18 without turning thereon. The collar 36 also surrounds the shaft 18 and has a handle 40 thereon for oscillating it. The collars 35 and 36 have inclined cam faces, as shown at 41, whereby the oscillation of the collar 36 relative to the collar 35 will move the collar 35 along the shaft 18, the collar 36 being prevented from moving to the right by a ring 42 secured to the shaft. This movement of the collar 35 slides the clutch piece 27 along the shaft and into contact with the flange 28 and as the clutch piece 27 is keyed to the shaft 18 the drum 19 will thereby be caused to rotate with the shaft. Ball thrust bearings 43 and 44 may be provided between the collar 36 and ring 42 and the collar 35 and the piece 27, respectively.

If desired the drum 19 may be provided with clutch teeth 45 to co-operate with a pivoted dog 46 suitably supported so that backward movement of the drum may be prevented.

It will be seen that the hoisting device as above described may be built as a unit, being adapted to be supported in a pair of separated bearings. In the present case the means for supporting the hoisting device comprises a pair of brackets or uprights 47 which are shown as mounted directly upon the side frame members 10 and one of the cross members 11 of the vehicle frame. The upper ends of these uprights 47 are provided with spherical openings 48 and two sleeves 49 having outer spherical bearings in the openings 48 are provided on the shaft 18. These sleeves are permitted slight end play on the shaft 18 and they may if desired be bushed both inside and outside so that the worn parts may be readily renewed. Grease cups 50 supply lubricant to the bearing surfaces of the sleeves 49 within the openings 48.

It will be understood that by thus mounting the hoisting device so that there is a spherical bearing between the gear mounting and the vehicle frame, the latter may warp or weave without affecting the alinement of the various parts of the device.

For the purpose of preventing the casing 24 from turning on the shaft 18, the casing is provided with a detachable lug 51, shown in detail in Fig. 3, and the head 52, of this lug is preferably formed with a spherical surface 53 which is adapted to contact with flat surfaces 54 on an opening in one of the brackets 47. By this arrangement the weaving movement of the frame in no way interferes with the position of the casing 24 and yet the latter is at all times prevented from turning with the shaft 18.

The worm 26 has a shaft 55 which extends through the casing 24 and a sprocket 56, a chain 57, and a sprocket 58, the latter being mounted on the shaft 15, form a driving connection between said driving shaft 15 and the worm shaft 55. This driving connection may be made loose enough to permit of slight relative movement between the shafts 15 and 55 caused by the weaving of the vehicle frame.

It will be understood that other forms of the invention may be made without departing from the spirit or scope hereof.

Having thus described my invention, what I claim and desire to secure by Letters Patent is:

1. In a motor vehicle, the combination with the frame comprising side members, and a driving shaft supported by the frame, of a pair of uprights supported on said side members, a hoisting device comprising a shaft and drum, spherical bearings for said shaft in said uprights, gearing having a casing supported by said shaft and loosely connected to one of said uprights to prevent rotation of the casing, and a driving connection from said driving shaft to said gearing.

2. In a machine of the class described, the combination with supporting means including a bracket, of a hoisting device comprising a shaft and gear casing, bearing means between the shaft and bracket permitting angular movement of the shaft relative to the bracket, and means comprising a loose connection between the casing and the bracket to hold the casing against turning with the shaft.

3. In a motor vehicle, the combination with the frame and a driving shaft, of a hoisting device including worm gearing and a supporting casing therefor, an upright mounted on the frame for supporting said hoisting device, the mounting between the worm gearing and said upright including a spherical bearing as one of its elements permitting weaving of the vehicle frame without disalining the gearing, a connection between said casing and a part rigid with said frame permitting such weaving while preventing rotation of the casing, and means for driving said gearing from said driving shaft.

4. In a motor vehicle, the combination with the frame side members and separated uprights mounted thereon, of a hoisting device comprising a horizontal shaft, bearings permitting slight angular movement of the shaft relative to said uprights, a gear casing supported on the shaft and having a part in contact with a part rigid with said frame so that rotation of said casing on the shaft is prevented without a rigid connection with said frame, gears in said casing, and means for driving said gears from said driving shaft.

5. In a winch, a frame, journal boxes thereon adapted to slight oscillatory movement, a drum shaft revolubly mounted in said boxes, a worm wheel fixed to said shaft, a worm, a worm housing supported by said shaft and capable of slight oscillatory movement, a stop secured to said frame, and means adapted to rotate said worm.

6. In combination, a winch comprising pedestals, a drum shaft and a worm wheel fixed thereon, spherical journal boxes on said pedestals, a worm wheel housing carried by said drum shaft and capable of slight oscillatory movement, a worm housing integral with said worm wheel housing, a worm revolubly mounted in said worm housing, a driving shaft, means for revolving said driving shaft, and stationary stops adapted to limit the oscillatory movement of said housings.

7. In a motor vehicle, a frame, a power shaft carried thereby, a pair of upright supporting members carried by said frame, a hoisting device including a shaft, supporting means for said hoist shaft carried by said upright members, said supporting means permitting universal movement of said hoisting shaft, worm gearing operatively connected to said hoisting shaft and flexible driving connections between said power shaft and said gearing.

8. In a motor vehicle, a frame including side members, a transverse frame member carried thereby, a hoisting device including a shaft, a plurality of members carried by said transverse member and having universal connections with said shaft for supporting said shaft, a power shaft carried by said transverse member, and gearing carried by said hoisting shaft and said power shaft for driving said hoisting shaft in all positions of movement thereof.

In testimony whereof I affix my signature.

FRANK H. DEWEY.